(12) United States Patent
Smith, III

(10) Patent No.: US 7,303,194 B2
(45) Date of Patent: Dec. 4, 2007

(54) SEAL RETAINER WITH PRESSURE ENERGIZED METAL SEAL MEMBERS FOR UNDERSEA HYDRAULIC COUPLING

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 701 days.

(21) Appl. No.: 10/689,392

(22) Filed: Oct. 20, 2003

(65) Prior Publication Data

US 2005/0082764 A1 Apr. 21, 2005

(51) Int. Cl.
*F16J 15/02* (2006.01)
*F16L 17/00* (2006.01)
*F16L 33/16* (2006.01)

(52) U.S. Cl. ............... 277/647; 285/110; 285/111; 137/614.04

(58) Field of Classification Search ........... 277/550, 277/647; 285/110, 111; 137/614.04
See application file for complete search history.

(56) References Cited

U.S. PATENT DOCUMENTS

| 528,773 | A | | 11/1894 | Ellis | |
|---|---|---|---|---|---|
| 869,536 | A | | 10/1907 | Weber | |
| 954,195 | A | | 4/1910 | Law | |
| 1,331,216 | A | | 2/1920 | Schneider | |
| 1,583,931 | A | | 5/1926 | Joyce | |
| 1,721,325 | A | | 7/1929 | Wilson | |
| 1,788,365 | A | | 1/1931 | Anderson | |
| RE18,296 | E | | 12/1931 | Pierce | |
| 1,913,982 | A | | 6/1933 | Fox | |
| 1,928,821 | A | | 10/1933 | Santiago | |
| 2,001,684 | A | * | 5/1935 | Johnson | 285/110 |
| 2,218,318 | A | | 10/1940 | Pfauser | |
| 2,265,267 | A | | 12/1941 | Cowles | |
| 2,498,080 | A | | 2/1950 | Jasse | |
| 2,521,692 | A | | 9/1950 | Costello | |
| 2,626,840 | A | | 1/1953 | Laurent | |
| 2,643,140 | A | | 6/1953 | Scheiwer | |
| 2,660,459 | A | | 11/1953 | Collins | |
| 2,730,380 | A | | 1/1956 | Epsy et al. | |
| 2,735,696 | A | | 2/1956 | Omon et al. | |
| 2,783,106 | A | | 2/1957 | Barnhart | |

(Continued)

FOREIGN PATENT DOCUMENTS

CH 343726 7/1956

(Continued)

OTHER PUBLICATIONS

Illustration of Connector Employing V-Seal, Bearing Notation "2:1 Scale".

(Continued)

*Primary Examiner*—Alison K Pickard
(74) *Attorney, Agent, or Firm*—Wong, Cabello, Lutsch, Rutherford, & Brucculeri, LLP

(57) ABSTRACT

An improved seal retainer for an undersea hydraulic coupling member, which utilizes pressure energized metal seals to maintain fluid integrity. One or more metal seals designed to have a press or interference fit are utilized in such a way that pressurized fluid trying to escape past the seal actually helps to pressure energize the seal to ensure a better seal.

14 Claims, 2 Drawing Sheets

U.S. PATENT DOCUMENTS

| | | | |
|---|---|---|---|
| 2,825,590 | A | 4/1958 | Sutherland |
| 2,839,314 | A | 6/1958 | Clark |
| 2,844,421 | A | 7/1958 | Hayman |
| 2,862,775 | A | 12/1958 | Kuplec |
| 2,976,066 | A | 3/1961 | Antonaides |
| 3,046,026 | A | 7/1962 | Burrows |
| 3,054,422 | A | 9/1962 | Napolitono |
| 3,058,750 | A | 10/1962 | Taylor |
| 3,089,713 | A | 5/1963 | Scaranucri |
| 3,111,179 | A | 11/1963 | Albers et al |
| 3,142,498 | A | 7/1964 | Press |
| 3,147,015 | A | 9/1964 | Hanback |
| 3,163,431 | A | 12/1964 | Tanner |
| 3,184,246 | A | 5/1965 | Kline |
| 3,201,151 | A | 8/1965 | Westveer |
| 3,205,911 | A | 9/1965 | Swick Jr. |
| 3,207,524 | A | 9/1965 | Trbovich |
| 3,215,161 | A | 11/1965 | Goodwin et al. |
| 3,233,921 | A | 2/1966 | Holmgren et al. |
| 3,236,251 | A | 2/1966 | Hansen |
| 3,279,806 | A | 10/1966 | Bialkowski |
| 3,288,472 | A | 11/1966 | Watkins |
| 3,291,152 | A | 12/1966 | Comer |
| 3,315,970 | A | 4/1967 | Halloway |
| 3,326,560 | A | 6/1967 | Trbovich |
| 3,348,575 | A | 10/1967 | Simak |
| 3,378,269 | A | 4/1968 | Castor |
| 3,447,819 | A | 6/1969 | Borsum et al. |
| 3,473,556 | A | 10/1969 | Johnson et al. |
| 3,498,324 | A | 3/1970 | Breuning |
| 3,507,523 | A | 4/1970 | Cadley |
| 3,508,580 | A | 4/1970 | Snyder Jr. |
| 3,516,524 | A | 6/1970 | Kelty et al. |
| 3,519,278 | A | 7/1970 | Fuhrman |
| 3,540,745 | A | 11/1970 | Flock |
| 3,550,624 | A | 12/1970 | Johnson |
| 3,601,154 | A * | 8/1971 | Demler ................ 137/881 |
| 3,618,690 | A | 11/1971 | Johnson |
| 3,625,251 | A | 12/1971 | Nelson |
| 3,647,226 | A | 3/1972 | Middelkoop |
| 3,707,878 | A | 1/1973 | Treichler |
| 3,727,952 | A | 4/1973 | Richardson |
| 3,759,552 | A | 9/1973 | Levinsohn et al. |
| 3,797,510 | A | 3/1974 | Torres |
| 3,891,246 | A | 6/1975 | Hopper |
| 3,899,199 | A | 8/1975 | Garey |
| 3,917,220 | A | 11/1975 | Gilmore |
| 3,918,485 | A | 11/1975 | Weber et al. |
| 4,044,993 | A | 8/1977 | Wheeler |
| 4,124,228 | A | 11/1978 | Morrison |
| 4,222,411 | A | 9/1980 | Herzan et al. |
| 4,302,020 | A | 11/1981 | Morales |
| 4,324,407 | A | 4/1982 | Upham et al. |
| 4,348,039 | A | 9/1982 | Miller |
| 4,369,977 | A | 1/1983 | Bishop et al. |
| 4,381,868 | A | 5/1983 | Croy et al. |
| 4,410,189 | A | 10/1983 | Myers et al. |
| 4,448,448 | A | 5/1984 | Pollia |
| 4,452,462 | A | 6/1984 | Karr, Jr. |
| 4,453,566 | A | 6/1984 | Henderson, Jr. et al. |
| 4,457,523 | A | 7/1984 | Halling et al. |
| 4,476,772 | A | 10/1984 | Gorman et al. |
| 4,496,162 | A | 1/1985 | McEver et al. |
| 4,532,958 | A * | 8/1985 | Napolitano ............ 137/454.2 |
| 4,556,196 | A | 12/1985 | Nimberger |
| 4,582,295 | A | 4/1986 | Kugler et al. |
| 4,589,689 | A | 5/1986 | Regan |
| 4,592,558 | A | 6/1986 | Hopkins |
| 4,602,806 | A | 7/1986 | Saliger |
| 4,637,470 | A | 1/1987 | Weathers et al. |
| 4,641,841 | A | 2/1987 | Regan |
| 4,656,393 | A | 4/1987 | Amboss |
| 4,658,847 | A | 4/1987 | McCrone |
| 4,694,859 | A | 9/1987 | Smith |
| 4,709,726 | A | 12/1987 | Fitzgibbons |
| 4,709,727 | A | 12/1987 | Gober |
| 4,747,606 | A * | 5/1988 | Jennings .................... 277/612 |
| 4,768,538 | A | 9/1988 | Mintz et al. |
| 4,781,399 | A | 11/1988 | Collon |
| 4,799,512 | A | 1/1989 | Sarson |
| 4,817,668 | A | 4/1989 | Smith |
| 4,832,080 | A | 5/1989 | Smith |
| 4,834,139 | A | 5/1989 | Fitzgibbons |
| 4,884,584 | A | 12/1989 | Smith |
| 4,900,071 | A | 2/1990 | Smith |
| 5,002,316 | A * | 3/1991 | Chohan .................... 285/110 |
| 5,015,016 | A | 5/1991 | Smith |
| 5,029,613 | A | 7/1991 | Smith |
| 5,031,923 | A * | 7/1991 | Davies ...................... 277/530 |
| 5,099,882 | A | 3/1992 | Smith |
| 5,203,374 | A | 4/1993 | Smith, III ............. 137/614.04 |
| 5,232,021 | A | 8/1993 | Smith |
| 5,277,225 | A | 1/1994 | Smith |
| 5,284,183 | A | 2/1994 | Smith |
| 5,355,909 | A | 10/1994 | Smith |
| 5,368,070 | A | 11/1994 | Bosley |
| 5,762,106 | A | 6/1998 | Smith |
| 5,893,389 | A * | 4/1999 | Cunningham ......... 137/516.27 |
| 6,007,106 | A * | 12/1999 | Wilkins .................... 285/110 |
| 6,179,002 | B1 | 1/2001 | Smith |
| 6,202,691 | B1 | 3/2001 | Smith |
| 6,651,693 | B2 * | 11/2003 | Simmons et al. ...... 137/329.05 |

FOREIGN PATENT DOCUMENTS

| | | |
|---|---|---|
| EP | 0024986 | 3/1981 |
| EP | 0177650 | 4/1986 |
| FR | 595332 | 9/1925 |
| FR | 663132 | 10/1928 |
| FR | 822572 | 1/1938 |
| FR | 1142462 | 12/1955 |
| FR | 76801 | 11/1958 |
| FR | 1297515 | 11/1962 |
| FR | 1491524 | 6/1966 |
| GB | 552435 | 4/1943 |
| GB | 552862 | 4/1943 |
| GB | 605006 | 7/1948 |
| GB | 677685 | 8/1952 |
| GB | 819421 | 9/1959 |
| GB | 886133 | 1/1962 |
| GB | 888143 | 1/1962 |
| GB | 925491 | 5/1963 |
| GB | 969155 | 11/1964 |
| GB | 1548852 | 7/1979 |
| GB | 1564906 | 4/1980 |
| GB | 1603670 | 11/1981 |
| GB | 2 223 552 | 4/1990 |
| GB | 2 277 357 | 10/1994 |
| GB | 2 358 052 | 7/2001 |
| SE | 144624 | 3/1954 |

OTHER PUBLICATIONS

Snap-tite Catolog, Snap-tite Ave. Union City, Pa. Jul. 1968.

* cited by examiner

SEAL RETAINER WITH PRESSURE ENERGIZED METAL SEAL MEMBERS FOR UNDERSEA HYDRAULIC COUPLING

BACKGROUND OF THE INVENTION

1. Field of the Invention

This invention relates, in general, to hydraulic couplings, and specifically to hydraulic couplings used in undersea drilling and production applications. More particularly, the invention involves undersea hydraulic couplings having seal retainers that hold and retain seals between the coupling members. The improved seal retainer of the present invention utilizes pressure actuated metal seals to improve the fluid integrity of the seal retainer and associated hydraulic coupling.

2. Description of Related Art

Subsea hydraulic couplings are old in the art. The couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section insertable into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

Optionally, a check valve may be installed in the female member and also in the male member. Each check valve is open when the coupling is made up; however, each check valve closes when the coupling is broken so as to prevent fluid from leaking out of the system of which the coupling is part.

Application Ser. No. 10/285,062 filed on Oct. 31, 2002 commonly assigned to the assignee of the present invention, entitled "Seal Retainer For Undersea Hydraulic Coupling," incorporated herein by reference, discloses a seal retainer for use with a female coupling member, wherein the seal retainer contains all seals for the female coupling. The seal retainer may be easily removed and repaired without damage to the female coupling member.

In higher pressure situations additional seal integrity may be desired to prevent fluid leakage from the hydraulic coupling. Therefore, what is needed is a seal retainer that contains a metal seal that can be pressure energized to prevent fluid leakage in either direction inside the coupling. A copending application filed on the same day as the present application with the same assignee and inventor entitled "Seal Retainer with Metal Seal Members for Undersea Hydraulic Couplings" is directed to the use of press fit or interference fit metal seals and is incorporated herein by reference.

SUMMARY OF THE INVENTION

The present invention provides an improved seal retainer for an undersea hydraulic coupling that provides higher integrity metal, pressure energized seals while still providing the benefits of removal of seals as a single unit together with the seal retainer. The metal seals are designed to engage both the male probe as well as shoulders inside the receptacle of the female coupling member.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
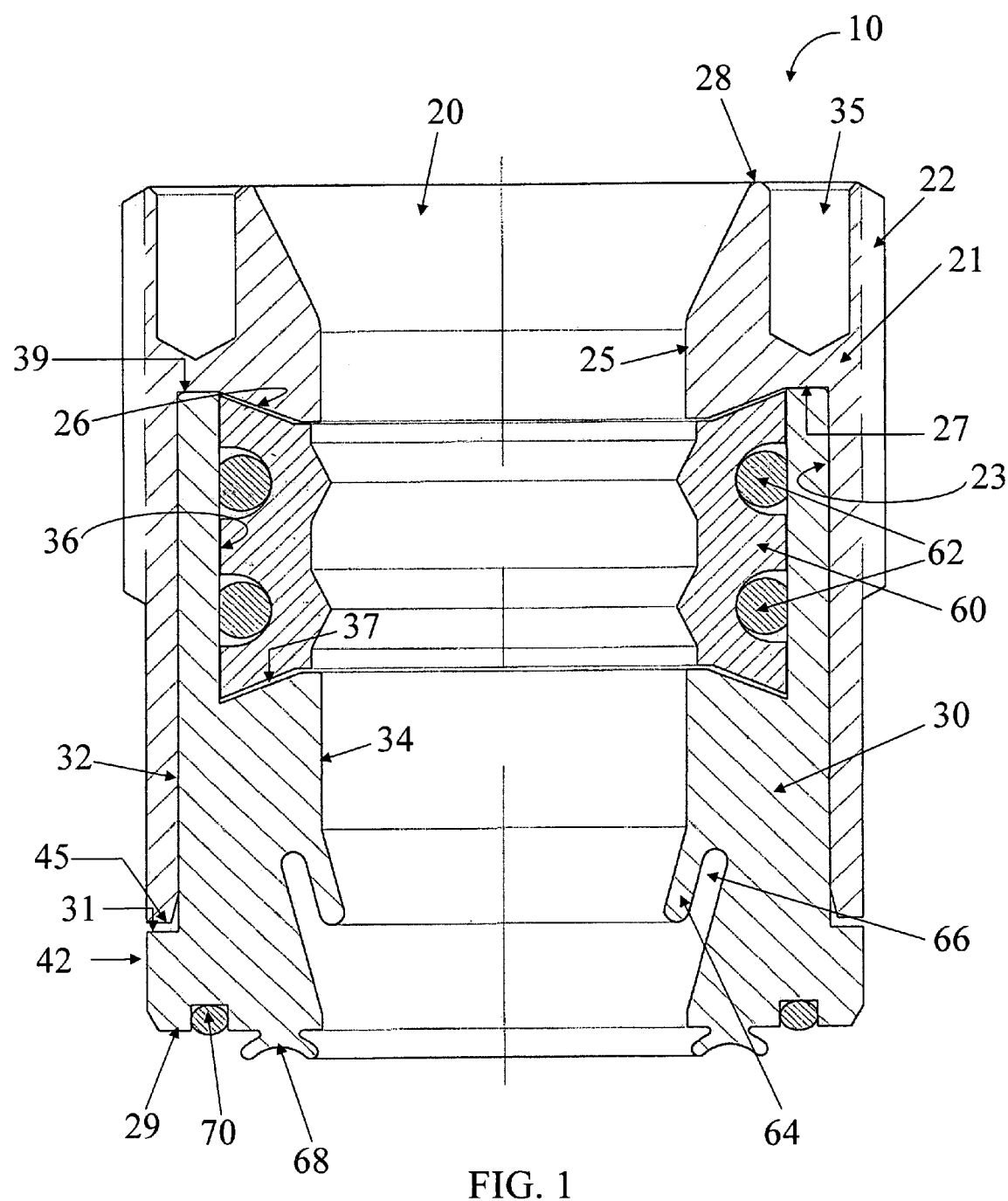
FIG. 1 is a section view of the improved seal retainer of the present invention according to a first embodiment.

As shown in FIG. 1, in a first embodiment, seal retainer 10 comprises shell 21 and seal carrier 30, with central bore 20 extending therethrough. The seal carrier fits together with the shell to form the seal retainer that may be inserted and removed from a female undersea hydraulic coupling member. The seal retainer 10 holds and secures one or more annular seals that are configured to engage the male coupling member.

In a first embodiment, the shell 21 is generally ring-shaped body with an outer diameter 22 that may be threaded to engage the female coupling member. The shell has first end 28, second end 45, first larger inner diameter 23, second smaller inner diameter 25, and internal shoulder 27 between the first and second inner diameters. The shell also may include negative or reverse angle shoulder 26 that extends radially inwardly from internal shoulder 27. Holes 35 may be included in the first end of the shell, and a spanner or other tool may be inserted into the holes to rotate the shell 21 to engage or disengage it from the female member.

In the first embodiment, the seal carrier 30 is a generally ring shaped body, part of which engages or fits at least partially into the shell 21. The seal carrier has first end 39 which fits into the shell, second end 29, first larger outer diameter 42, second smaller outer diameter 32, first larger inner diameter 36, and second smaller inner diameter 34. In one embodiment, the seal carrier may have negative or reverse angle shoulder 37 between the first larger inner diameter and second smaller inner diameter. The seal carrier also may include outer shoulder 31 between the first larger outer diameter and the second smaller outer diameter.

In one embodiment, the first end of the seal carrier slides into the first larger inner diameter of 23 of the shell. There may be little or no clearance between the second smaller outer diameter of the seal carrier and the inner diameter of the shell, or there may be a slight interference fit. When the first end of the seal carrier is fully inserted into the shell, the first end 39 may abut internal step 27 of the shell, and second end 45 of the shell may abut outer shoulder 31 of the seal carrier.

In the embodiment of FIG. 1, the seal retainer holds third annular seal 60 between reverse angled shoulders 26 and 37 that restrain the seal from implosion into central bore 20. Third annular seal 60 may be an elastomeric ring with a dovetail cross section, and may have a dovetail interfit between the reverse angled shoulders. The inner diameter of the third annular seal 60 may extend further into the central bore than the smaller inner diameters of the shell or seal carrier, to seal radially with the male member when the male member is in the receiving chamber. O-rings 62 are included on the outer circumference of the third annular seal to form a seal with inner diameter 36 of the seal carrier 30.

Seal carrier 30 is preferably made of metal. Machined out of the body of seal carrier 30 is a metal lip seal 64 that extends around the inner circumference. The metal lip seal 64 is machined so that when the probe of the male coupling member is inserted into the female coupling member, the metal lip seal 64 will be forced out slightly causing a press fit or interference fit. The distance the metal lip seal 64 is displaced is preferably around 0.001 inches. Pressurized fluid will tend to try and escape the coupling up along the probe of the male member, or around the outside of seal retainer 10. Metal lip seal 64 is designed to prevent fluid loss along the probe. If pressurized fluid is attempting to flow up along the probe, it will first fill cavity 66, which as the pressure builds, will simply work to increase the seal pressure of the metal lip seal 64 against the probe. To prevent fluid flow around the seal retainer 10, concave metal seal 68 and o-ring 70 are used.

Figure 2:
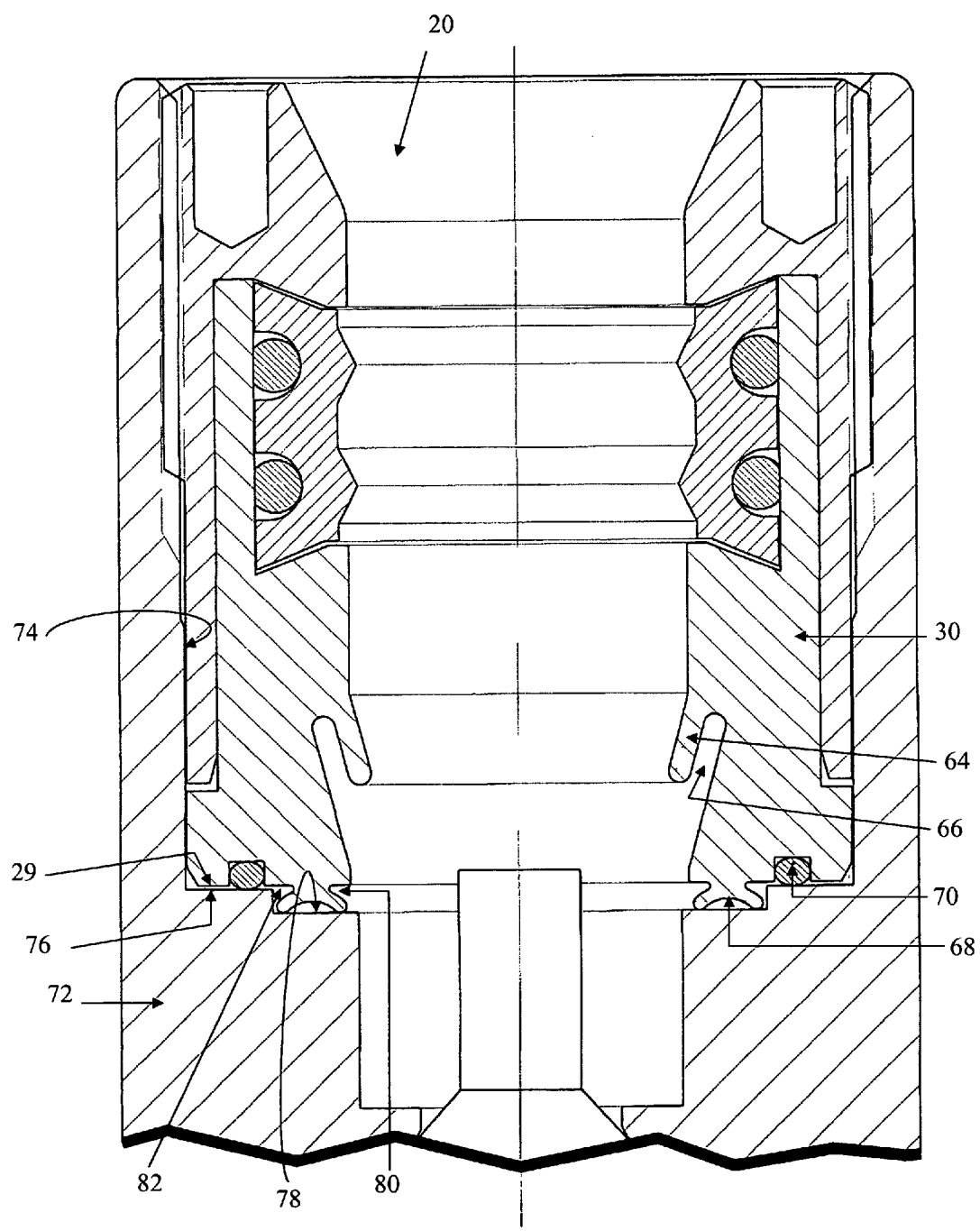
FIG. 2 is a section view of a female coupling member with the improved seal retainer according to the first embodiment.

FIG. 2 shows the seal retainer 10 as shown in FIG. 1 as it is installed in a female coupling member 72. As can be seen in FIG. 2, the female coupling member has a receptacle defined by inner diameter 74 for receiving the seal retainer. The female coupling member additionally has shoulders 76 and 78 for contacting end 29 of the seal carrier, as well as seals 68 and 70. Metal concave seal 68 is machined so that when end 29 is in contact with shoulder 76, the legs of concave metal seal 68 are in press contact with shoulder 78 so that some slight displacement of the legs of seal 68 occurs. The displacement of the legs of metal concave seal 68 is preferably in the range of 0.001 inches. When the probe of the male coupling member is inserted, cavity 80 will remain. If pressurized fluid attempts to flow around the seal retainer from the male probe, the fluid will fill cavity 80 first causing increased pressure on metal concave seal 68 to further seal off the fluid flow. Vice versa, if fluid from outside the coupling tries to come around the seal retainer and gets past primary seal 70, the fluid will likewise fill cavity 82 causing additional pressure to further seal off fluid flow using metal concave seal 68. As will be apparent to others of skill in the art, metal concave seal 68 could be designed to be pressure energized from only one direction using just a lip seal as with 64.

As those of skill in the art, not only are there variations to the configurations of the metal seals that may be made, but the invention could be used with only one metal seal, or additional metal seals. The invention, accordingly, should be understood to be limited only by the scope of the appended claims.

What is claimed is:

1. A seal retainer for an undersea female hydraulic coupling member, comprising:
  a. a first metal seal integral with the seal retainer for creating a pressure-energized seal between the seal retainer and a probe of a male coupling member inserted in a female hydraulic coupling member containing the seal retainer; and,
  b. a second metal seal integral with the seal retainer for creating a pressure-energized seal between the seal retainer and a female hydraulic coupling member containing the seal retainer.

2. The seal retainer of claim 1 wherein the first integral metal seal is a metal lip seal.

3. The seal retainer of claim 2 wherein the first integral metal lip seal is dimensioned such that it is slightly displaced when the probe of a male coupling member is inserted.

4. The seal retainer of claim 3 wherein the displacement of the first integral metal lip seal is about 0.00 1 inches.

5. A seal retainer as recited in claim 2 wherein the seal retainer comprises a substantially outer shell and a substantially inner seal carrier comprising a metal body and the first integral metal lip seal and the second integral metal seal are machined into the body of the seal carrier.

6. The seal retainer of claim 2 wherein the first integral metal lip seal is configured to be pressure energized by fluid surrounding the probe of the male member.

7. The seal retainer of claim 1 wherein the second integral metal seal is a metal concave seal.

8. The seal retainer of claim 7 wherein the metal concave seal is adapted to be pressure energized by fluid pressure on either the interior or exterior of the seal retainer.

9. An undersea female hydraulic coupling member comprising a seal retainer comprising a first integral metal pressure energized seal for forming a seal between the seal retainer and a probe of a male coupling member inserted in the female coupling member, and a second integral pressure energized metal seal for forming a seal between the seal retainer and a shoulder of the female coupling member containing the seal retainer.

10. The undersea hydraulic coupling member of claim 9 wherein the first integral metal pressure energized seal is a metal lip seal.

11. The undersea hydraulic coupling member of claim 10 wherein the second integral pressure energized metal seal is a metal concave seal.

12. The undersea hydraulic coupling member of claim 10 wherein the integral metal lip seal is slightly displaced when the probe of the male coupling member is inserted into the female coupling member.

13. The undersea hydraulic coupling member of claim 11 wherein the integral metal concave seal is slightly displaced when the seal retainer is installed in the female coupling member.

14. The undersea hydraulic coupling member of claim 13 wherein the displacement of the integral metal lip seal is about 0.001 inches.

* * * * *